D. MORIARTY.
RESILIENT WHEEL.
APPLICATION FILED APR. 17, 1919.
1,334,111.
Patented Mar. 16, 1920.
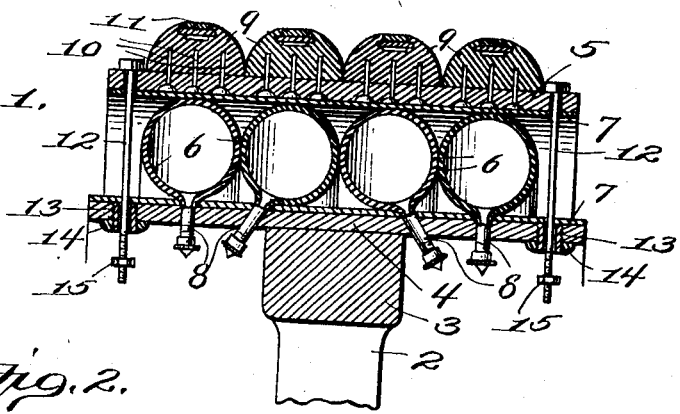
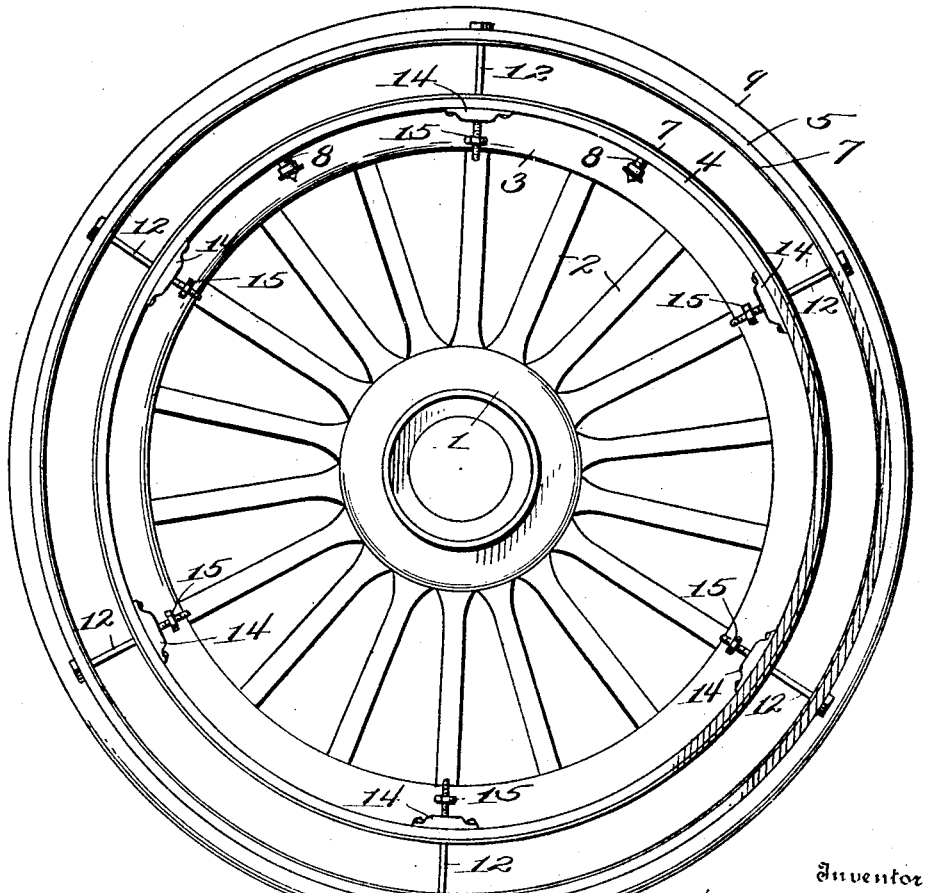
Inventor
Daniel Moriarty

UNITED STATES PATENT OFFICE.

DANIEL MORIARTY, OF OAKLAND, CAILFORNIA.

RESILIENT WHEEL.

1,334,111.

Specification of Letters Patent. Patented Mar. 16, 1920.

Application filed April 17, 1919. Serial No. 290,856.

*To all whom it may concern:*

Be it known that I, DANIEL MORIARTY, a citizen of the United States, residing at Oakland, in the county of Alameda and State of California, have invented new and useful Improvements in Resilient Wheels, of which the following is a specification.

My present invention relates to vehicle wheels of the kind adapted for use on automobiles, motor trucks and similar vehicles and the object of the invention is to provide a novel and improved wheel which will be more durable and which will have a greater load-carrying capacity than pneumatic tires as usually used and yet it will afford substantially the same amount of resilience as that afforded by the usual pneumatic tire. Also the structure of the wheel is such that it may be built easily to carry different loads as conditions may require.

To this and other ends the invention consists in certain improvements and combinations and arrangement of parts, all as will hereinafter be more fully described the features of novelty being pointed out particularly in the claim at the end of the specification.

In the accompanying drawings—

Figure 1 represents a section taken radially through a portion of a vehicle wheel constructed in accordance with the present invention.

Fig. 2 represents a side elevation of a complete wheel embodying the invention.

Similar parts are designated by the same reference characters in both views.

The present invention is applicable generally to the wheels of automobiles, motor trucks and other vehicles where it is desirable or necessary to afford resilience. The invention is particularly adapted for use in connection with the wheels of motor trucks having relatively large load-carrying capacity and a wheel suitable for such use is illustrated in the accompanying drawing and will be hereinafter described in detail. It is to be understood, however, that the invention is not restricted to the precise construction shown as equivalent constructions are contemplated and will be included within the scope of the claim.

In the present instance, the wheel shown comprises a hub 1, spokes 2 and felly 3 which are preferably rigid and may be composed of wood as is usual, and the wheel also comprises an inner rim 4 and an outer rim 5. The rim 4, which is preferably of cylindrical form, as shown, is fixed to and encircles the felly 3. The outer rim 5 is larger in diameter than that of the inner rim 4, thus providing an annular space between the rims to contain pneumatic cushions. Different numbers of pneumatic cushions may be used according to the calculated or intended load-carrying capacity of the wheel, four of these cushions 6 being shown in the present instance and arranged in parallelism and each extending completely around the annular space between the rims. These pneumatic cushions are composed of composite rubber and fabric tubes capable of being inflated to pressures usually employed with penumatic tires and are capable of sustaining such pressures without unduly stretching or expanding, although they are compressible under the weight of the inner rim 4. In order to prevent injury to the pneumatic cushions by corrosion of the rims 4 and 5, which rims are preferably made of steel or other suitable metal, the adjacent faces of the rims are preferably lined with leather or other appropriate material indicated at 7. The stems 8 for the pneumatic cushions may extend through the inner rim 4 as shown to enable them to be inflated. The outer rim 5 carries a suitable tread. As shown, the tread is composed of four sections 9, although different numbers of treads may obviously be used. Each tread is composed of rubber composition similar to that used in the manufacture of the usual solid tires, metal rivets 10 extending downwardly through the outer rim 5 with the heads of the rivets countersunk as shown and the tread sections being attached to the outer rim by molding or vulcanizing it upon the rim and the projecting rivets. The rivets will securely anchor the tread sections to the rim and will prevent creeping of the tread sections thereon. The ground-engaging portions of the tread sections may also have chains 11 molded or set therein, as shown in Fig. 1.

In order to prevent relative circumferential or lateral displacement of the outer rim relatively to the inner rim, a suitable number of bolts 12 are passed loosely through holes formed in the opposite edges of the outer rim 5, these bolts being spaced at intervals circumferentially of the rim and the bolts having heads which are adapted to abut against the outer side of the rim. The inner ends of the bolts extend loosely through nipples 13 which are threaded through the inner rim 4 adjacent to its opposite edges, these nipples serving as guides for the bolts and being reinforced by fittings 14 which are threaded on the portions of the nipples which project inwardly from the inner rim, the parts 14 being secured by screws or other suitable means to the inner side of the inner rim. The guides 13 and their reinforcements 14 are used preferably on the driving wheels of an automobile or motor truck for the reason that the extended bearings provided by guides 13 effectively prevent relative rotation between the inner and outer rims, although permitting relative radial movements between the rims. However, in constructing the front wheel for an automobile or motor truck, the extended bearing is unnecessary, in which case the guides 13 and their reinforcements 14 may be omitted and the bolts 12 extended through suitable openings formed in the inner rim. Undue radial movement between the rims is prevented by nuts 15 which are threaded upon the inner ends of the bolts and these nuts may be set to regulate the amount of resilience afforded by the wheel. Furthermore, these nuts and the bolts carrying them will prevent relative collapsing of the rims should the pneumatic cushions become injured or destroyed.

Obviously in constructing wheels for vehicles to carry relatively lighter loads, the rims may be made narrower than those shown and two or three pneumatic cushions may be used. By constructing these rims so as to present substantially cylindrical faces between them, the pneumatic cushions may be introduced into place or removed easily and without requiring disassembling of the wheel as a whole.

The present invention provides a wheel which affords the resilience of a pneumatic tire and yet it is capable of carrying much greater loads than is possible with pneumatic tires. This greatly increased load-carrying capacity of the wheel is obtained without undue air pressure in the pneumatic tire as such air pressure may be equal to that usually used in pneumatic tires, the increased load-carrying capacity of the wheel being obtained because the load upon the wheel is distributed between and shared by the plurality of pneumatic cushions.

I claim as my invention—

A vehicle wheel comprising an inner rigid portion having a peripheral rim, an outer rim spaced from the inner rim to form an annular space between the rims, a set of annular pneumatic cushions located side by side and contained in said annular space, the opposite side edges of the inner and outer rims projecting laterally beyond the opposite sides of the said set of cushions and providing annular margins which are spaced to form side openings which are continuations of said annular space, said margins having circumferentially spaced pairs of radial openings therein, and radial members fitted in the respective pairs of openings in said margins and operative to prevent relative lateral movement between the rims and to limit relative radial and circumferential movements between the rims.

In testimony whereof I have hereunto set my hand in presence of two subscribing witnesses.

DANIEL MORIARTY.

Witnesses:
RALPH A. KNAPP,
HILDA B. SHEPARD.